Patented Oct. 6, 1925.

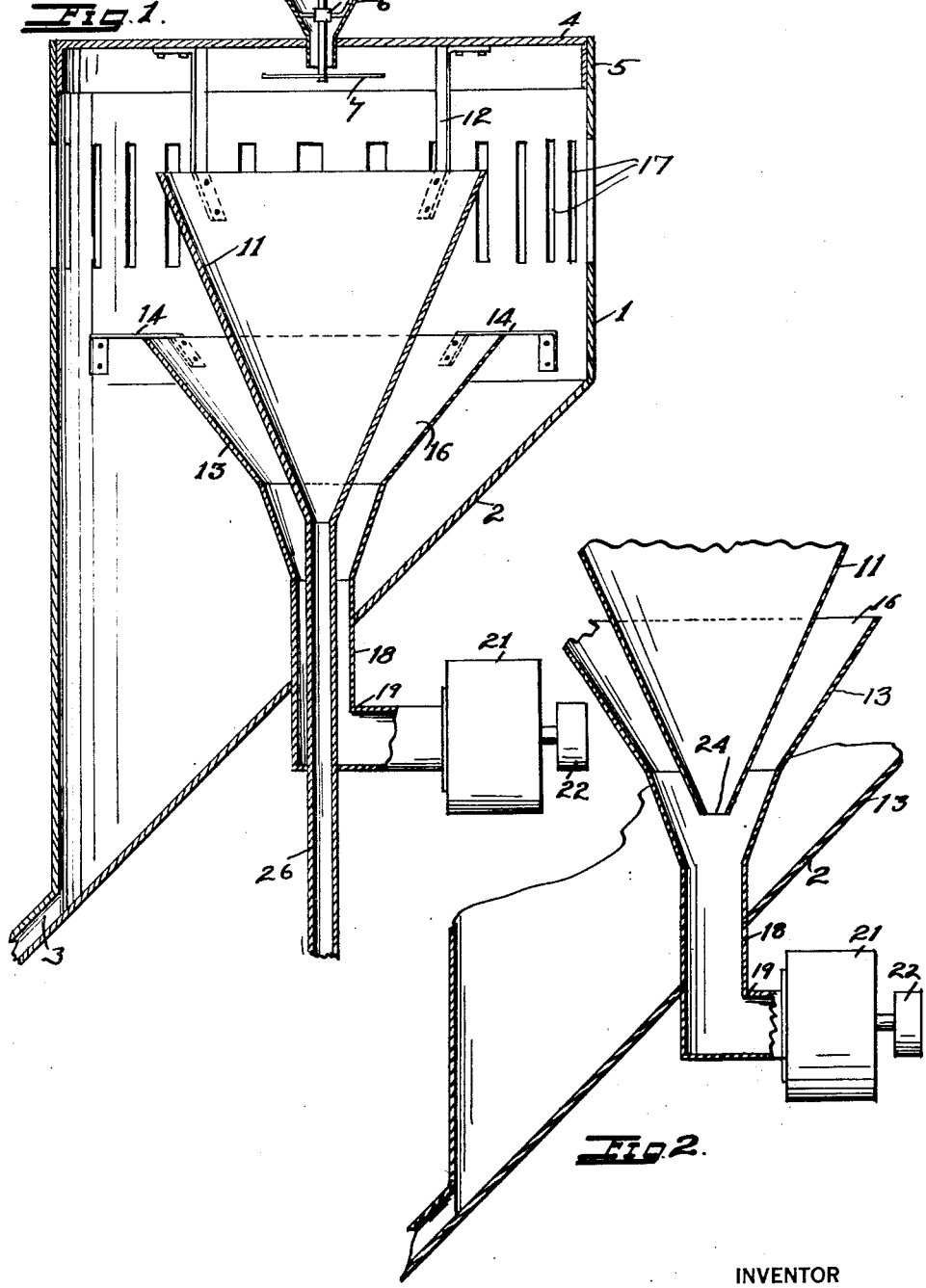

1,556,110

UNITED STATES PATENT OFFICE.

HENRY D. HELLMERS, OF LAS VEGAS, NEVADA, ASSIGNOR TO WEST END CHEMICAL COMPANY, OF OAKLAND, CALIFORNIA, A CORPORATION OF CALIFORNIA.

PROCESS FOR SEPARATING CALCINED COLEMANITE FROM CLAY AND OTHER IMPURITIES.

Application filed April 10, 1923. Serial No. 631,139.

*To all whom it may concern:*

Be it known that I, HENRY D. HELLMERS, a citizen of the United States, and a resident of Las Vegas, county of Clark, State of Nevada, have invented a new and useful Process for Separating Calcined Colemanite from Clay and Other Impurities, of which the following is a specification.

The present invention relates to a process for separating calcined colemanite from clay and other impurities and the particular object of the invention is to simplify the process so that it may be carried out economically without waste of time and in a continuous manner. It is proposed to utilize for this process a centrifugal separator described and claimed in my copending application, Serial No. 631,138 filed April 10, 1923.

The material to be treated containing calcined colemanite in its usual state of fine division, the particles being either granular or pulverulent or a mixture of both, and the impurities of the ore or gangue, such as clay, limestone, sandstone or others, are fed onto a plate or disc which is thereupon caused to revolve in a horizontal, or nearly horizontal plane. Centrifugal force, generated by the revolutions of this plate, throws the material off the plate into the air, each particle so thrown following a curved path or trajectory, due to the combined pull of gravity and centrifugal force. In accordance with the known laws of centrifugal force, the particles of higher specific gravity generate a flatter and longer trajectory than the particles of lower specific gravity, with the result that these higher gravity particles fall to the ground at a point further away from the axis of rotation, extended vertically downward than do the particles of lower gravity. Since it is true that the specific gravity of calcined colemanite is much lower than the specific gravity of the impurities usually found in its ores, such as those mentioned above and others, it follows that by this means a separation of this calcined colemanite from its accompanying impurities is readily made by subjecting the mixed material to the action of centrifugal force as described above.

The preferred form in which this process may be carried out is illustrated in the accompanying drawing in which Figure 1 shows a vertical section through one form of a separator adapted to be used for this purpose while Figure 2 shows a vertical section of a modified form. While I have shown only the preferred form of the invention I wish to have it understood that various changes or modifications may be made within the scope of the claims hereto attached without departing from the spirit of the invention.

In its preferred form my device comprises a cylindrical housing (1) having a slanting bottom (2) and an outlet port (3) at its lowest point. The top of the housing is closed by any suitable means such as the lid (4) having the flanges (5) engaging the upper margin of the housing. In the lid is supported, in central relation to the same, a hopper (6) through which the material separated may be fed on a disc (7) provided on the vertical shaft (8) supported in the bearing (9). The shaft (8) may be rotated by any suitable means not shown in the drawing.

Underneath the disc and in central relation to the housing I provide a funnel shaped vessel (11) supported on brackets (12) extending downwardly from the lid (4).

A second funnel shaped vessel (13) of somewhat larger dimensions is disposed in concentric relation to the first vessel and is supported on brackets (14) extending from the side of the housing. The second vessel is sufficiently larger than the first one to leave ample space between the two as shown at (16). It should be noted that the top of the vessel (11) is of considerably larger diameter than the disc (7) while the top of the vessel (13) is slightly larger than the top of the vessel (11) but surrounds only the lower portion of the latter vessel. The housing (1) which is preferably made air tight as nearly as possible in other respects is provided with a plurality of apertures (17) in operative proximity to the upper ends of the two vessels. The lower vessel (13) terminates at the bottom in a pipe (18) extending through the slanting bottom (2) of the cylinder and turning as shown at (19) to communicate with a fan (21) adapted to be driven by any suitable means through the pulley (22). The upper vessel (11) may either be cut as shown at (24) in the form of Figure 2 or it may communicate with an inner pipe (26) extending through the pipe (18) in the manner shown in Figure 1.

The operation of my separator may be explained as follows: The material to be separated is fed through the hopper (6) on the central portion of the disc (7). When the latter is rotated the material is discharged peripherally by centrifugal force and the heavier particles will naturally be thrown further than the lighter particles which it is the object of the present invention to separate from the heavier particles. All the lighter particles dropping within a limited circular area around the axis of the disc will be received by the inner vessel (11) while the heavier particles will be thrown beyond the reach of the said vessel. Most of the latter particles are allowed to drop to the bottom of the housing and to be discharged through the outlet (3). The vessel (13) however being of slightly larger circumference than the vessel (11) will catch a certain number of the heavier particles, that is those which stay nearest the outlines of the upper vessel. At the same time the fan is set in motion and suction is created within the housing causing a draft from the apertures (17) into the second vessel (13), which draft passes through the rain of heavier particles dropping outside of the upper vessel (11). It will be understood that of those heavier particles the lighter ones will remain in close proximity to the outlines of the two vessels while the heaviest particles are thrown further outwardly. It should also be understood that a given draft will have more power to deflect lighter particles from their natural course than heavier particles. As a result the draft will cause the lighter ones of the heavier particles dropping outside of the two vessels when following the natural course to be drawn into the second vessel.

If the device is constructed as shown in Figure 2 the lighter particles received in the vessel (11) will mix with the somewhat heavier particles drawn into the vessel (13) but when the modified form of Figure 1 is used the contents of the two vessels may be kept separate. If this is done the particles delivered from the upper vessel (11) through the pipe (26) will be purer and of higher grade than the material discharged through the second vessel (13).

I claim:

1. The process of separating calcined colemanite from clay and other impurities which consists in discharging the material to be treated peripherally to cause a rain of particles over a circular zone, of baffling the lighter particles falling naturally in the central area of the zone in one separation and collecting these particles, and in separating the adjacent layer of slightly heavier particles from those still heavier and farther outward and beyond by a suction toward the center of the zone.

2. The process for separating calcined colemanite from clay and other impurities which consists in discharging the material to be treated peripherally by centrifugal force in baffling the lighter particles dropping naturally within a limited central area and collecting the particles in a receiving vessel and in drawing certain of the heavier particles dropping outside of the receiving vessel into a second vessel by suction.

3. The process of separating calcined colemanite from clay and other impurities which consists in discharging the material to be treated peripherally in a substantially horizontal plane to cause a rain of particles over a circular zone, of baffling the lighter particles falling naturally in the central area over a circular plane relatively near the peripheral discharge and collecting these particles and of collecting certain of the heavier particles by suction over an annular plane below and adjacent said circular plane.

HENRY D. HELLMERS.